United States Patent [19]
Fujimoto et al.

[11] Patent Number: 5,376,711
[45] Date of Patent: Dec. 27, 1994

[54] POLY(ETHYLENE 2,6-NAPHTHALATE) FILM

[75] Inventors: Masahiko Fujimoto, Yokohama; Kazuhiro Kunugihara, Machida, both of Japan

[73] Assignee: Diafoil Hoechst Company, Limited, Tokyo, Japan

[21] Appl. No.: 36,338

[22] Filed: Mar. 24, 1993

[30] Foreign Application Priority Data

Mar. 24, 1992 [JP] Japan .................................... 4-66309

[51] Int. Cl.$^5$ .............................. C08J 5/10; C08K 3/18; C08K 3/22; C08L 31/06
[52] U.S. Cl. ................................. 524/430; 525/175; 525/176; 525/177; 525/502
[58] Field of Search ............... 524/430; 525/175, 176, 525/177, 502

[56] References Cited

U.S. PATENT DOCUMENTS 5,051,292 3/1991 Kotah et al. .................... 428/141

FOREIGN PATENT DOCUMENTS

| | | |
|---|---|---|
| 0372423 | 6/1990 | European Pat. Off. . |
| 0423402 | 4/1991 | European Pat. Off. . |
| 0432725 | 6/1991 | European Pat. Off. . |
| 0498387 | 8/1992 | European Pat. Off. . |
| 0510654 | 10/1992 | European Pat. Off. . |
| 2245056 | 9/1990 | Japan . |
| 3195742 | 8/1991 | Japan . |

*Primary Examiner*—Paul R. Michl
*Assistant Examiner*—U. K. Rajguru
*Attorney, Agent, or Firm*—Foley and Lardner

[57] ABSTRACT

A poly(ethylene 2,6-naphthalate) film obtained by stretching a poly(ethylene 2,6-naphthalate) sheet containing cross-linked polymer particles which have at least one ethylene glycol unit and have an average particle size of from 0.05 to 3 μm and a spherical ratio of from 1.0 to 1.1, wherein a deformation ratio of the cross-linked polymer particles in the stretching is from 1.2 to 3.0, has excellent runnability, abrasive resistance and strength.

17 Claims, No Drawings

POLY(ETHYLENE 2,6-NAPHTHALATE) FILM

BACKGROUND OF THE INVENTION

1. Field of the Invention

The present invention relates to a poly(ethylene 2,6-naphthalate) film which has excellent runnability, abrasion resistance and strength.

2. Description of Related Art

Recently, a small thickness and high strength of a base film are increasingly required, because of a long recording time and a small size of a video tape and an increased capacity of a capacitor. It is difficult to satisfy sufficiently these requirements, when a conventional poly(ethylene terephthalate) film is used as the base film. A poly(ethylene 2,6-naphthalate) film which is stretched in machine and transverse directions at nigh drawing ratios has developed as a substitute for the poly(ethylene terephthalate) film. The poly(ethylene 2,6-naphthalate) film has excellent strength, but fine particles contained in the film easily drop off from a film surface because of high draw ratios in machine and transverse directions. The generation of abrasion powder due to dropped particles causes a fault, namely a drop out in the magnetic recording application, and undesirably decreased dielectric strength in the capacitor application.

SUMMARY OF THE INVENTION

An object of the present invention is provide a poly(ethylene 2,6-naphthalate) film having no drop off of particles and high strength.

This and other objects of the present invention are achieved by a poly(ethylene 2,6-naphthalate) film obtainable by stretching a poly(ethylene 2,6-naphthalate) sheet containing 0.01 to 3% by weight of cross-linked polymer particles which comprise at least one ethylene glycol unit and have an average particle size of from 0.05 to 3 μm and a spherical ratio of from 1.0 to 1.1, wherein a deformation ratio of the cross-linked polymer particles in the stretching is from 1.2 to 3.0.

DETAILED DESCRIPTION OF THE INVENTION

Poly(ethylene 2,6-naphthalate) means a polyester prepared from a raw material containing, as main components, 2,6-naphthalene dicarboxylic acid or ester thereof and ethylene glycol. A third component such as other dicarboxylic acid component and other glycol component may be contained in the raw material. The other dicarboxylic acid component includes, for example, isophthalic acid, terephthalic acid, adipic acid and sebacic acid, which may be used soley or in combination. The other glycol component includes, for example, diethylene glycol, propylene glycol, bunanediol, 1,4-cyclohexane dimethanol and neopentyl glycol, which may be used soley or in combination. In poly(ethylene 2,6-naphthalate) according to the present invention, an amount of the ethylene 2,6-naphthalate units is at least 80% by mol of all units.

The poly(ethylene 2,6-naphthalate) film of the present invention is orientated at least in one direction and can be prepared by any of the known methods. For example, the material is melt-extruded at 290°–330° C. into a sheet. The sheet is cooled and solidified at 40°–80° C. to prepare an amorphous sheet, stretched biaxially in a machine direction and a transverse direction at a draw ratio in area of from 4 to 20 at 130°–170° C. successively or simultaneously, and thermally treated at 180°–270° C. In the stretching in the machine and transverse directions, the sheet may be stretched in a single step or plural steps in each direction. Between the plural stretching steps, the sheet may be thermally treated for orientation relaxation. After the biaxial stretching and before the thermal treatment, the sheet may be restretched. The restretching may be conducted biaxially or in one of the machine and transverse directions. In order to strengthen the sheet, after the biaxial stretching of the sheet, the sheet may often restretched at a draw ratio of from 1.05 to 4.0 in the machine and transverse directions and then thermally treated.

Most important characteristic of the present invention is to use, as the particles contained in the film, the cross-linked polymer particles which have good affinity with poly(ethylene 2,6-naphthalate) and do not drop off from the film due to suitable deformation so as to form no void between the polymer and the particle during the stretching.

In order to improve the affinity of the crosslinked polymer particles with poly(ethylene 2,6-naphthalate), the cross-linked polymer contains at Least one ethylene glycol unit ($-CH_2CH_2O-$).

The spherical ratio of the cross-linked polymer particles is defined as a ratio of a maximum diameter to a minimum diameter of the particles before the particles are added to the film. The spherical ratio of the particles is from 1.0 to 1.1, preferably 1.0 to 1.05. The deformation ratio of particles after the stretching of film is defined as a ratio of a maximum diameter to a minimum diameter of particles contained in the film, the deformation ratio is from 1.2 to 3.0, preferably from 1.2 to 1.5. When the spherical ratio is larger than 1.1, the film surface is not improved. When the deformation ratio is smaller than 1.2, voids are formed around the particles so that the particles easily drop off from the film. When the deformation ratio is larger than 3.0, protrusions on the film surface formed by the particles are broad so that the runnability and the abrasive resistance are insufficient.

A method for preparing the cross-linked polymer particles used according to the present invention is not limited. In a typical example, the particles can be prepared by emulsion polymerization using at least one monovinyl compound (A) containing only one olefinically unsaturated bond in a molecule, at least one compound (B), as a cross-linking agent, containing at least two olefinically unsaturated bonds in a molecule, and at least one compound (C) containing at least one ethylene glycol unit in a molecule. The compounds (B) and (C) may be the same compound. The emulsion polymerization is used herein in wide sense and includes soap free emulsion polymerization and seed emulsion polymerization.

Specific examples of the component (A) are acrylic acid, methacrylic acid and alkyl or glycidyl ester thereof; maleic anhydride and an alkyl derivative thereof; vinyl glycidyl ether; vinyl acetate; styrene; and alkyl-substituted styrene. Specific examples of the compound (B) are divinylbenzene and divinylsulfone. Specific examples of the compound (C) are ethylene glycol monoacrylate, ethylene glycol monomethacrylate, ethylene glycol diacrytate and ethylene glycol dimethacrylate.

A content of the ethylene glycol unit in the cross-linked polymer particles used in the present invention is usually from 3 to 35% by weight, preferably from 5 to 25% by weight. When the ethylene glycol unit content is smaller than 3% by weight, the particles may have insufficient affinity with poly(ethylene 2,6-naphthalate). When the content is larger than 35% by weight, the preparation of particles is difficult.

In the present invention, it is necessary to select a composition of the particles so as to give easy deformability of the particles. A cross-linking degree of particles has a most significant effect on the easy deformability. When the cross-linking degree is too large, the deformability of the particles is low. When the cross-linking degree is too small, thermal resistance of the particles is low. A content of the compound (B) which is the cross-linking agent is from 5 to 30% by weight, preferably from 10 to 25% by weight based on the particle weight.

One embodiment of the preparation of the cross-linked particle is as follows. After a polymerization initiator such as a water-soluble polymerization initiator (for example, hydrogen peroxide and potassium persulfate) in a desired amount is dissolved in an aqueous medium, a mixed solution of compounds (A), (B) and (C) in desired amounts is added. Then, the mixture is reacted at a temperature which is at least a decomposition starting temperature of the polymerization initiator, preferably at 30°–90° C., for 3–10 hours with stirring. Because particles may be partly aggregated depending on the monomer composition, a dispersion stabilizer such as an emulsifier may be added so as to maintain dispersion stability. In any case, the particles are obtained in the form of an aqueous slurry in which the particles are homogeneously dispersed.

An average particle size of the cross-linked polymer particles used in the present invention is from 0.05 to 3 μm, preferably from 0.1 to 1 μm. When the average particle size is smaller than 0.05 μm, runnability and abrasive resistance of the film are insufficient. When the average particle size is larger than 3 μm, surface roughness is undesirably large.

A content of the cross-linked polymer particles in the film is from 0.01 to 3% by weight, preferably from 0.05 to 0.5% by weight. When the content is smaller than 0.01% by weight, slidability and abrasive resistance of the film are insufficient. When the content is larger than 3% by weight, surface roughness of the film is undesirably large.

A method for mixing the cross-linked polymer particles with polyester which is a raw material of the film is not limited. For example, when the prepared particles are in an ethylene glycol slurry dispersion form, the dispersion is added to the film raw material at any step of polyester preparation, preferably after the completion of the esterification or transesterification reaction and before the beginning of the polycondensation.

The film may contain other particles such as kaolin, talc, calcium carbonate, silicon dioxide and aluminum oxide, insofar as the effect of the present invention is not deteriorated. A content of the other particles is usually at most 0.5% by weight, preferably from 0.05 to 0.3% by weight based on the film weight. The other particles have a diameter of usually from 0.01 to 1.0 μm, preferably from 0.03 to 0.3 μm. When the fine aluminum oxide particles having a diameter of from 0.01 to 0.05 μm are used, scuff resistance of the film is improved.

A Young's modulus in a machine direction of the poly(ethylene 2,6-naphthalate) film is usually at least 600 kg/mm$^2$, preferably at least 700 kg/mm$^2$, more preferably at least 800 kg/mm$^2$, and a Young's modulus in a transverse direction is usually at least 600 kg/mm$^2$, preferably at least 650 kg/mm$^2$, more preferably at least 800 kg/mm$^2$. These requirements of Young's modulus are important for thin film formation. For example, in the case of a base film for a long time-recording magnetic tape, when the magnetic tape runs repeatedly, edges of the magnetic tape corrugates to give adverse effects on the runnability and the electrical properties of the magnetic tape. The corrugation of the tape edge is referred to as a tape edge damage. The film according to the present invention less suffers from the tape edge damage.

The poly(ethylene 2,6-naphthalate) film according to the present invention has excellent runnability, abrasive resistance and mechanical strength and is suitable for, for example, a base film for a long time-recording magnetic recording tape. The film according to the present invention is useful as a base film in various fields, such as in a capacitor and heat-sensitive transfer.

PREFERRED EMBODIMENT OF THE INVENTION

The present invention is illustrated by the following Examples which do not limit the present invention.

In the Examples, "part" means "part by weight", unless specified. In the Examples, various properties were measured as follows:

(1) Average particle size

Using a scanning electron microscope observation of each particle, a maximum diameter and a minimum diameter were determined and then arithmetic mean value thereof was defined as an average particle size (diameter) of one particle. Diameters of at least 100 particles were measured to give the arithmetic mean value.

(2) Spherical ratio

Using a scanning electron microscope observation of each particle, a maximum diameter and a minimum diameter were determined and then a ratio of maximum diameter/minimum diameter was calculated. The ratios of at least 100 particles were calculated and arithmetic mean value thereof was defined as a spherical ratio.

(3) Deformation ratio

After the a small piece of a stretched film containing particles was fixed by means of molding of an epoxy resin and then cut with a microtome. A cross-section of the film in a longitudinal direction (machine direction) was observed by a transmission electron microscope. As to the particles which are present within 5 μm from the film surface, maximum and minimum diameters of each particle were measured and a ratio of maximum diameter/minimum diameter each particle was calculated. The ratios of at least 100 particles were calculated and arithmetic mean value thereof was defined as a deformation ratio.

(4) Average ,roughness of film surface

Using a surface roughness tester (SE-3F manufactured by Kosaka Kenkyusho, Ltd. ), the center line average roughness ($R_a$) was measured according to JIS B-0601.

(5) Young's modulus of the film

Using a tensile tester (Intesco Model 2001 manufactured by Intesco, Ltd. ), under the condition of temperature 23° and humidity 50%RH, a film specimen having a length of 300 mm and a width of 20 mm was drawn at a strain speed of 10%/min. Using the beginning straight part of a strain-stress curve, a Young's modulus was calculated according to the following equation:

Young's modulus (E) = $\Delta\sigma/\Delta\epsilon$ (kg/mm$^2$)

wherein $\Delta\sigma$ is a stress difference based on original average cross-sectional area between the two points on the straight line and $\Delta\sigma$ is strain difference between the same points.

(6) Runnability

Runnability was evaluated according to a slipperiness. The slipperiness was determined by contacting the film with a fixed hard chromium-plated metal roller (diameter: 6 mm) at an angle ($\theta$) of 135°, running the film at a speed of 1 m/min. with the application of a load of 53 g (T$_2$) at one end, measuring a resistance force (T$_1$ (g)) at the other end and then calculating a running friction coefficient ($\mu$d) according to the following equation.

$\mu d = (180/\pi\theta) \times ln(T_1/T_2) = 0.424 \times ln(T_1/53)$ (7) Abrasive resistance Abrasive resistance was evaluated according to an amount of generated white powder described hereinafter.

Amount of Generated White Powder

With contacting the film with a fixed hard chromium pin having a diameter of 6 mm at an angle of 135°, the film was run for a distance of 1000 m at a speed of 10 m/min. and a tensile force of 200 g. Abrased white powder adhered to the pin was visually observed and evaluated as follows:
  Rank A: No adhesion of white powder
  Rank B: Slight adhesion of white powder
  Rank C: Small amount (larger than Rank B) adhesion of white powder
  Rank D: Very much adhesion of white powder (8) Properties of magnetic tape A magnetic fine powder (200 parts), a polyurethane resin (30 parts), nitrocellulose (10 parts), vinyl chloride/cellulose acetate copolymer (10 parts), lecithin parts), cyclohexanone (100 parts), methyl isobutyl ketone (100 parts) and methyl ethyl ketone (300 parts) were mixed and kneaded for 48 hours in a ball mill, and then a polyisocyanate compound (5 parts) was added to prepare a magnetic paint. The magnetic paint was coated on a polyester film. Before sufficient drying of the paint, the paint was magnetically orientated and then dried so that a thickness of the dried magnetic layer was 6 $\mu$m to prepare a magnetic tape.

Contamination of Calendering Roller

Then, a contamination degree of a roller surface contacting to a magnetic tape was evaluated using a five step supercalender. The supercalender was five-step calender consisting of mirror finished metal rollers and polyester composite resin rollers. In each roller, a temperature was fixed at 85° C., a line pressure was fixed at 250 kg/cm and a running velocity was fixed at 80 m/min. The magnetic layer-coated film of 5000 m in length was repeatedly run seven times, and white powder adhered to the resin roller was visually observed and evaluated as follows:
  Good: Substantially no adhesion of white powder to the resin roller
  Fair: Slight adhesion of white powder
  Bad: Apparent adhesion of white powder Tape edge damage With contacting the magnetic tape of ½ inch in width with a fixed hard chromium pin having a diameter of 6 mm at an angle of 135°, the magnetic tape was run back and force 50 times at a speed of 4 m/min. and a tensile force of 50 g. Then, edges of the magnetic tape were visually observed and evaluated as follows:
  Good: No corrugation at the edges
  Fair: Slight corrugation at the edges
  Bad: Much corrugation at the edges The Number of Dropouts A Video tape which recorded signals of 4.4 MHz was reproduced and then the number of dropouts was counted for about 20 minutes by a dropout counter (manufactured by Ohkura Industry, Ltd.). The number of dropouts was converted to the number of dropout per one minute.

(9) Scuff resistance

With contacting a base film surface of the magnetic tape of ½ inch in thickness with a fixed hard chromium-plated metal pin (finishing: 3S) having a diameter of 6 mm at an angle of 135° the base film surface was slidden once at a speed of 4 m/min. and a tensile force of 50 g. Then, an aluminum layer of 1000 Å in thickness was deposited on slidden surface of the base film by a vapor deposition, and an amount of scratches was visually observed and evaluated as follows:
  Rank 1: Very much amount of the scratch
  Rank 2: Much amount of the scratch
  Rank 3: Amount of the scratch between ranks 2 and 4
  Rank 4: Slight amount of the scratch
  Rank 5: No amount of the scratch

EXAMPLE 1

Preparation of Cross-linked Polymer Particles

To desalted water (1500 parts), a water-soluble polymerization initiator potassium persulfate (3.2 parts) and a dispersion stabilizer sodium lauryl sulfate (0.004 parts) were added and dissolved to prepare a homogenous solution. To the solution, a mixture solution consisting of styrene (65 parts), ethylene glycol dimethacrytate (20 parts) and divinylbenzene (15 parts) was added. The mixture was polymerized at 70° C. for 8 hours under nitrogen gas atmosphere with stirring. A conversion degree was 98% and resultant particles had an average particle size of 0.20 $\mu$m and a spherical ratio of 1.05.

Then, ethylene glycol (2000 part) was added to resultant slurry and heated under a reduced pressure to distill off water.

Preparation of Polyester

In a reactor, dimethyl naphthalene-2,6-dicarboxylate (100 parts), ethylene glycol (60 parts) and magnesium acetate tetrahydrate (0.09 parts) were charged. The mixture was heated to distill off methanol so as to conduct a transesterification reaction and the temperature of the mixture was increased to 230° C. for 4 hours to complete the transesterification reaction.

The ethylene glycol slurry containing 0.2 parts of the cross-linked polymer particles was added, and then phosphoric acid (0.03 parts) and antimony trioxide (0.04 parts) were added and a polycondensation reaction was conducted by a conventional method to prepare poly- (ethylene 2,6-naphthalate) having an intrinsic viscosity of 0.51. The resultant polymer was polymerized in a solid state at 0.3 mm Hg and 235° C. for 8 hours to prepare poly(ethylene 2,6-naphthalate) having an intrinsic viscosity of 0.65.

The resultant poly(ethylene 2,6-naphthalate) was extruded at 295° C. into a sheet by an extruder and then a electrostatic application cooling method was used to give a amorphous sheet. The sheet was stretched 140° C. at a draw ratio of 2.6 in the machine direction and at a draw ratio of 4.2 in the transverse direction by a tenter, and then restretched at 160° C. at a draw ratio of 1.80 in the machine direction and thermally treated with tentering at 220° C. at a draw ratio of 1.10 in the transverse direction to prepare poly(ethylene 2,6-naphthalate) film having a thickness of 7 μm. Properties of the film were evaluated.

Then, the film was coated with a magnetic layer to prepare a magnetic tape. Properties of the magnetic tape were evaluated.

COMPARATIVE EXAMPLE 1

The same manner as in Example 1 was repeated to prepare a poly(ethylene 2,6-naphthalate) film except that a mixture solution consisting of styrene (85 parts) and divinylbenzene (15 parts) was used as the monomer and no ethylene glycol dimethacrylate was used to prepare cross-linked polymer particles.

COMPARATIVE EXAMPLE 2

The same manner as in Example 1 was repeated to prepare a poly(ethylene 2,6-naphthalate) film except that a mixture solution consisting of styrene (40 parts), ethylene glycol dimethacrylate (20 parts) and divinylbenzene (40 parts) was used as the monomer to prepare cross-linked polymer particles.

EXAMPLE 2

The same manner as in Example 1 was repeated to prepare a poly(ethylene 2,6-naphthalate) film except that a draw ratio of the restretching is 1.90 and a ratio of the tentering after the restretching is 1.15.

COMPARATIVE EXAMPLE 3

The same manner as in Example 2 was repeated to prepare a poly(ethylene 2,6-naphthalate) film except that a mixture solution consisting of styrene (76 parts), ethylene glycol dimethacrylate (20 parts) and divinylbenzene (4 parts) was used as the monomer to prepare cross-linked polymer particles.

COMPARATIVE EXAMPLE 4

The same manner as in Example 1 was repeated to prepare a poly(ethylene 2,6-naphthalate) film except that a draw ratio in a machine direction is 4.0, a draw ratio in a transverse direction is 3.8 and no restretching is conducted.

EXAMPLE 3

The same manner as in Example 1 was repeated to prepare a poly(ethylene 2,6-naphthalate) film except that δ-aluminum oxide powder having a primary particle size of 0.03 μm was added in addition to the cross-linked polymer particles.

EXAMPLE 4

The same manner as in Example 1 was repeated to prepare a poly(ethylene 2,6-naphthalate) film except that vaterite calcium carbonate powder having an average particle size of 0.60 μm was added in addition to the cross-linked polymer particles.

COMPARATIVE EXAMPLE 5

The same manner as in Example 1 was repeated to prepare a poly(ethylene 2,6-naphthalate) film except that spherical silica powder having an average particle size of 0.20 μm was used instead of the cross-linked particles and δ-aluminum oxide powder having a primary particle size of 0.03 μm was further added.

The results in Examples 1 to 4 and Comparative Examples 1 to 5 are shown in the following Tables 1 to 3.

TABLE 1

| Example No. | 1 | Com. 1 | Com. 2 |
|---|---|---|---|
| <Mixed particles> | | | |
| Average particle size (μm) | 0.20 | 0.20 | 0.20 |
| Content of particles (wt %) | 0.2 | 0.2 | 0.2 |
| Spherical ratio | 1.05 | 1.05 | 1.05 |
| Deformation ratio | 1.70 | 1.70 | 1.10 |
| <Properties of film> | | | |
| $R_a$ (μm) | 0.007 | 0.007 | 0.008 |
| Young's modulus (kg/mm$^2$) | | | |
| Machine direction | 685 | 685 | 684 |
| Transverse direction | 650 | 652 | 655 |
| Slipperiness | 0.40 | 0.41 | 0.39 |
| Abrasive resistance | | | |
| Amount of generated white powder | A | C | C |
| <Properties of magnetic tape> | | | |
| Contamination of calender roller | Good | Bad | Bad |
| Dropout (number/min.) | 4 | 25 | 26 |
| Tape edge damage | Fair | Fair | Fair |
| Scuff resistance | 3 | 2 | 2 |

TABLE 2

| Example No. | 2 | Com. 3 | Com. 4 |
|---|---|---|---|
| <Mixed particles> | | | |
| Average particle size (μm) | 0.20 | 0.20 | 0.20 |
| Content of particles (wt %) | 0.2 | 0.2 | 0.2 |
| Spherical ratio | 1.05 | 1.05 | 1.05 |
| Deformation ratio | 2.00 | 3.50 | 1.40 |
| <Properties of film> | | | |
| $R_a$ (μm) | 0.006 | 0.005 | 0.007 |
| Young's modulus (kg/mm$^2$) | | | |
| Machine direction | 805 | 806 | 590 |
| Transverse direction | 723 | 722 | 545 |
| Slipperiness | 0.43 | 0.58 | 0.46 |
| Abrasive resistance | | | |
| Amount of generated white powder | A | B | A |
| <Properties of magnetic tape> | | | |
| Contamination of calender roller | Good | Good | Good |
| Dropout (number/min.) | 4 | 10 | 7 |
| Tape edge damage | Good | Good | Bad |
| Scuff resistance | 3 | 2 | 3 |

TABLE 3

| Example No. | 3 | 4 | Com. 5 |
|---|---|---|---|
| <Mixed particles> | | | |
| First particles | | | |
| Kind | Cross-linked polymer particles | Cross-linked polymer particles | Spherical silica |
| Average particle size (μm) | 0.20 | 0.20 | 0.20 |
| Content of particles (wt %) | 0.2 | 0.2 | 0.2 |
| Spherical ratio | 1.05 | 1.05 | 1.05 |
| Deformation ratio | 1.70 | 1.70 | 1.05 |

TABLE 3-continued

| Example No. | 3 | 4 | Com. 5 |
|---|---|---|---|
| Second particles | | | |
| Kind | $Al_2O_3$ | Vaterite $CaCO_3$ | $Al_2O_3$ |
| Average particle size (μm) | 0.03 | 0.6 | 0.03 |
| Content of particles (wt %) | 0.30 | 0.01 | 0.30 |
| <Properties of film> | | | |
| Ra (μm) | 0.007 | 0.007 | 0.008 |
| Young's modulus (kg/mm$^2$) | | | |
| Machine direction | 685 | 687 | 685 |
| Transverse direction | 652 | 650 | 653 |
| Slipping property | 0.40 | 0.38 | 0.30 |
| Abrasive resistance | | | |
| Amount of generated white powder | A | A | D |
| <Properties of magnetic tape> | | | |
| Contamination of calender roller | Good | Good | Bad |
| Dropout (number/min.) | 3 | 2 | 38 |
| Tape edge damage | Fair | Fair | Fair |
| Scuff resistance | 5 | 3 | 5 |

The film of the present invention has a homogeneous fine surface structure, and excellent abrasive resistance and strength. The film can be used as an industrial material, for example, a base film, e.g. for a magnetic recording medium.

What is claimed is:

1. A poly(ethylene 2,6-naphthalate) film obtained by stretching a poly(ethylene 2,6-naphthalate) sheet containing 0.01 to 3% by weight of cross-linked polymer particles which comprise at least one ethylene glycol unit and have an average particle size of from 0.05 to 3 μm and a spherical ratio of from 1.0 to 1.1, wherein the deformation ratio of the cross-linked polymer particles in the stretching is from 1.2 to 3.0.

2. The poly(ethylene 2,6-naphthalate) film according to claim 1, wherein the film is obtained by a method in which a poly(ethylene 2,6-naphthalate) material containing the cross-linked polymer particles is melt-extruded at 290°–330° C. into a sheet, and the sheet is cooled and solidified to prepare an amorphous sheet, stretched biaxially in a machine direction and a transverse direction at a draw ratio from 4 to 20 at 130°–170° C. successively or simultaneously, and thermally treated at 180°–270° C.

3. The poly(ethylene 2,6-naphthalate) film according to claim 1, wherein the cross-linked polymer particles are obtained by an emulsion polymerization using at least one monovinyl compound (A) containing only one olefinically unsaturated bond in a molecule, at least one compound (B), as a cross-linking agent, containing at least two olefinically unsaturated bonds in a molecule, and at least one compound (C) containing at least one ethylene glycol unit in a molecule.

4. The poly(ethylene 2,6-naphthalate) film according to claim 3, wherein the component (A) is at least one compound selected from the group consisting of acrylic acid, methacrylic acid and alkyl or glycidyl ester thereof; maleic anhydride and an alkyl derivative thereof; vinyl glycidyl ether; vinyl acetate; styrene; and alkyl-substituted styrene.

5. The poly(ethylene 2,6-naphthalate) film according to claim 3, wherein the compound (B) is at least one compound selected from the group consisting of divinylbenzene and divinylsulfone.

6. The poly(ethylene 2,6-naphthalate) film according to claim 3, wherein the compound (C) is at least one compound selected from the group consisting of ethylene glycol monoacrylate, ethylene glycol monomethacrylate, ethylene glycol diacrylate and ethylene glycol dimethacrylate.

7. The poly(ethylene 2,6-naphthalate) film according to claim 1, wherein the content of the ethylene glycol unit in the cross-linked polymer particles is from 3 to 35% by weight.

8. The poly (ethylene 2,6-naphthalate) film according to claim 3, wherein the content of the compound (B) is from 5 to 30% by weight based on particle weight.

9. The poly(ethylene 2,6-naphthalate) film according to claim 1, which further contains fine aluminum oxide particles.

10. The poly(ethylene 2,6-naphthalate) film according to claim 1, which has a Young's modulus of at least 600 kg/mm$^2$ in both the machine and transverse directions.

11. The poly(ethylene 2,6-naphthalate) film according to claim 1, wherein the film comprises at least 80 mol percent of ethylene 2,6-naphthalate units based on the total number of units in the film.

12. The poly(ethylene 2,6-naphthalate) film according to claim 1, wherein the spherical ratio is from 1.0 to 1.05 and the deformation ratio is from 1.2 to 1.5.

13. The poly(ethylene 2,6-naphthalate) film according to claim 1, wherein the content of cross-linked polymer particles is from 0.05 to 0.5% by weight.

14. The poly(ethylene 2,6-naphthalate) film according to claim 1, wherein the cross-linked polymer particles have an average particle size of from 0.1 to 1 μm.

15. The poly(ethylene 2,6-naphthalate) film according to claim 1, wherein the film has a Young's modulus in both the machine and transverse directions of at least 800 kg/mm$^2$.

16. A capacitor comprising a poly(ethylene 2,6-naphthalate) film according to claim 1.

17. The poly(ethylene 2,6-naphthalate) film according to claim 1, wherein the poly(ethylene 2,6-naphthalate) is prepared by a process comprising transesterification and polycondensation and wherein the cross-linked polymer particles are added between the transesterification and polycondensation steps.

* * * * *